United States Patent
Xiaomang et al.

(10) Patent No.: US 7,065,246 B2
(45) Date of Patent: Jun. 20, 2006

(54) IMAGE PROCESSING APPARATUS

(75) Inventors: Zhang Xiaomang, Tenri (JP); Kensuke Takai, Kyoto (JP); Hideaki Kawamura, Yamatotakada (JP); Katsuya Otoi, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 925 days.

(21) Appl. No.: 09/935,738

(22) Filed: Aug. 24, 2001

(65) Prior Publication Data

US 2002/0041331 A1    Apr. 11, 2002

(30) Foreign Application Priority Data

Aug. 25, 2000   (JP)   .............................. 2000-256516

(51) Int. Cl.
G06K 9/00   (2006.01)
G03F 3/08   (2006.01)

(52) U.S. Cl. ....................... 382/162; 382/167; 358/518

(58) Field of Classification Search ........ 382/162–167, 382/260, 262, 263, 264; 358/501, 512, 518, 358/519, 520

See application file for complete search history.

(56) References Cited

U.S. PATENT DOCUMENTS

| 4,931,864 A | * | 6/1990 | Kawamura et al. | .......... 358/519 |
| 4,959,659 A | * | 9/1990 | Sasaki et al. | ................ 358/502 |
| 5,111,283 A | * | 5/1992 | Nagasawa et al. | ........ 348/231.3 |

FOREIGN PATENT DOCUMENTS

JP    11-164309    6/1999

OTHER PUBLICATIONS

T. Abe et al., "Digital Signal Processing System of Single-Chip CCD Color camera for Business Use", 55-58, Toshiba Review, 1994 vol. 49 No. 1.

* cited by examiner

*Primary Examiner*—Duy M. Dang
(74) *Attorney, Agent, or Firm*—Birch, Stewart, Kolasch & Birch, LLP

(57) ABSTRACT

An image processing apparatus for processing complementary color image data output from an image capturing element including a complementary-color filter is provided. The apparatus comprises a middle-high-range luminance component compensation section for compensating for a middle-high-range luminance component of a low-frequency luminance signal generated based on the complementary color image data such that the low-frequency luminance signal has substantially an ideal frequency characteristic which is lower than or equal to a predetermined frequency.

18 Claims, 15 Drawing Sheets

FIG.2
RELATED ART

|    | Δx |    |    |    |    |
|----|----|----|----|----|----|
| Ye | Cy | Ye | Cy | Ye | Cy |
| Gr | Mg | Gr | Mg | Gr | Mg |
| Ye | Cy | Ye | Cy | Ye | Cy |
| Gr | Mg | Gr | Mg | Gr | Mg |
| Ye | Cy | Ye | Cy | Ye | Cy |
| Gr | Mg | Gr | Mg | Gr | Mg |

Color array of complementary-color filter

FIG.3

| Ye1  | Cy2  | Ye3  |
|------|------|------|
| Gr4  | Mg5  | Gr6  |
| Ye7  | Cy8  | Ye9  |
| Gr10 | Mg11 | Gr12 |

Part of color array of complementary-color filter of Fig.2

FIG.4

| x / y | 1/2 | 1 | 1/2 |
|---|---|---|---|
| 1/2 | 1/4 | 1/2 | 1/4 |
| 1 | 1/2 | 1 | 1/2 |
| 1/2 | 1/4 | 1/2 | 1/4 |

YeCyGrMg complementary filter

FIG. 5A

| x / y | 1/16 | -3/16 | 10/16 | 10/16 | -3/16 | 1/16 |
|---|---|---|---|---|---|---|
| 1/16 | 1/256 | -3/256 | 10/256 | 10/256 | -3/256 | 1/256 |
| -3/16 | -3/256 | 9/256 | -30/256 | -30/256 | 9/256 | -3/256 |
| 10/16 | 10/256 | -30/256 | 100/256 | 100/256 | -30/256 | 10/256 |
| 10/16 | 10/256 | -30/256 | 100/256 | 100/256 | -30/256 | 10/256 |
| -3/16 | -3/256 | 9/256 | -30/256 | -30/256 | 9/256 | -3/256 |
| 1/16 | 1/256 | -3/256 | 10/256 | 10/256 | -3/256 | 1/256 |

First YH extraction filter F1

FIG. 5B

| x / y | 1/8 | 3/8 | 3/8 | 1/8 |
|---|---|---|---|---|
| 1/8 | 1/64 | 3/64 | 3/64 | 1/64 |
| 3/8 | 3/64 | 9/64 | 9/64 | 3/64 |
| 3/8 | 3/64 | 9/64 | 9/64 | 3/64 |
| 1/8 | 1/64 | 3/64 | 3/64 | 1/64 |

Second YH extraction filter F2

Middle-range luminance component extraction filter

High-range luminance component extraction filter

FIG.10

| 1 | -5 | 4 | 4 | -5 | 1 |   (A)

| -1 | 2 | -1 |   (B)

| -1 | 0 | 2 | 0 | -1 |   (C)

| 1 | 2 | 1 |   (D)

| 1 | 1 |   (E)

FIG.17

| 1/256 | −3/256 | 10/256 | 10/256 | −3/256 | 1/256 |
|---|---|---|---|---|---|
| −3/256 | 5/256 | −42/256 | −42/256 | 5/256 | −3/256 |
| 10/256 | −42/256 | 64/256 | 64/256 | −42/256 | 10/256 |
| 10/256 | −42/256 | 64/256 | 64/256 | −42/256 | 10/256 |
| −3/256 | 5/256 | −42/256 | −42/256 | 5/256 | −3/256 |
| 1/256 | −3/256 | 10/256 | 10/256 | −3/256 | 1/256 |

IMAGE PROCESSING APPARATUS

BACKGROUND OF THE INVENTION

1. Field of the Invention

The present invention relates to an image processing apparatus for obtaining a high-quality image by processing image data captured by a CCD (charge-coupled device) area sensor using a complementary-color filter. The image processing apparatus may be used in a digital camera (e.g., an electronic still camera) or the like.

2. Description of the Related Art

Conventionally, it has been known that a complementary-color filter has a higher transmittance, and obtains a higher number of G-components obtained in extracting a luminance component, than those of a primary-color filter. Therefore, when a complementary-color filter is used in a CCD area sensor, a high-sensitivivity image data can be obtained.

An exemplary CCD area sensor with a complementary-color filter will be described below by taking a color video camera as an example. FIG. 15 shows a complementary-color filter having pixel units. The complementary-color filter is provided at a light-receiving element surface side of the CCD area sensor. The CCD area sensor is a color difference progressive type CCD, in which image data is read out in such a manner that a color signal is obtained as a color difference signal every scanning line and alternately between an odd-numbered field and an even-numbered field. Specifically, the CCD area sensor is scanned as follows. Referring to FIG. 15, first, an odd-numbered field is read out in such a manner that the value of an odd-numbered pixel is added by the value of a subsequent even-numbered pixel (numbering is conducted in a vertical direction from top to bottom). Thereafter, a subsequent even-numbered pixel is read out in such a manner that the value of an even-numbered pixel is added by the value of a subsequent odd-numbered pixel, unlike the odd-numbered field. For example, in the case of an odd-numbered field, a signal is obtained on a scanning line ① in the order of Ye+Mg and Cy+Gr, and a signal is obtained on a scanning line ② in the order of Ye+Gr and Cy+Mg. In the case of an even-numbered field, a signal is obtained on a scanning line ①' in the order of Mg+Ye and Gr+Cy, and a signal is obtained on a scanning line ②' in the order of Gr+Ye and Mg+Cy. Hereinafter, such a signal is also referred to as a scanning line input when it is input to a subsequent stage of an image processing apparatus.

A relationship between Ye (yellow), Cy (cyan), Mg (magenta), and Gr (green) of the complementary-color filter of FIG. 15, and three primary colors, i.e., R (red), G (green), and B (blue) is ideally represented by:

$$Ye=R+G,\ Cy=G+B,\ Mg=R+B,\ Gr=G \qquad (6).$$

The thus-read image data is processed by a CDS (Correlated Double Sampling) circuit for reducing noise, and then by an AGC (Automatic Gain Control) circuit for adjusting gain. The resultant image data is converted to digital image data by an A/D conversion circuit having a resolution of 10 bits, for example. The resultant digital image data is input to an image processing apparatus in which the digital image data is subjected to various kinds of image processing. Finally, the resultant image data is output as a video signal to be displayed. The CDS circuit, the AGC circuit, and the A/D conversion circuit are included in a scanning line input section 410 of a color difference progressive type CCD in FIG. 16. This conventional image processing apparatus will be described below in more detail with reference to "Digital Signal Processing System of Single-Chip CCD Camera for Business Use", Toshiba Review, 1994, Vol. 49, No. 1.

FIG. 16 is a block diagram showing an exemplary configuration of an image processing apparatus (signal processing system) in a conventional color video camera. Referring to FIG. 16, a signal processing system 400 of a color video camera includes: a horizontal-vertical contour emphasizing section 401 which receives a scanning line input of a color difference progressive type CCD; a low-pass filter (LPF) 402 which receives the scanning line input; a gamma correction section 403 which receives an output of the low-pass filter (LPF) 402; a color separation section 404 which receives the scanning line input; a white balance adjusting section (WB) 405 which receives an output of the color separation section 404, a gamma correction section 406 which receives an output of the white balance adjusting section 405; a color difference matrix section 407 which receives an output of the gamma correction section 406 and outputs color difference signals Cr and Cb; a constant luminance processing section 408 which receives outputs of the gamma correction section 403 and the color difference matrix section 407; and an adder 409 which receives outputs of the horizontal-vertical contour emphasizing section 401 and the constant luminance processing section 408 and outputs a luminance signal Y.

The horizontal-vertical contour emphasizing section 401 receives an output from the scanning line input 410 of the color difference progressive type CCD and performs horizontal-vertical contour emphasizing processing. The horizontal contour emphasizing processing is performed for neighboring image data on the same scanning line. For example, (Ye+Mg)−(Cy+Gr) is calculated on the scanning line ①. Vertical contour emphasizing processing is performed for image data on neighboring scanning lines in a field. For example, (Ye+Mg)−(Ye+Gr) is calculated on the scanning lines ① and ②.

The low-pass filter (LPF) 402 receives an output from the scanning line input section 410 and cuts out a high-range luminance component to output a broad frequency luminance component Y1. The broad frequency component Y1 is calculated in groups of four pixels for each scanning line in accordance with expression (7) below. It should be noted that the center of the broad frequency component Y1 is the center of four pixels in each scanning line. Calculation of expression (7) is carried out in groups of four pixels on the scanning line ① of FIG. 15.

$$Y1=Ye+Cy+Mg+Gr \qquad (7)$$

The gamma correction section 403 receives the broad frequency luminance component Y1 output from the low-pass filter 402 and performs gamma correction. By the gamma correction, an image is modified so as to fit characteristics of a display or printer from which the image is output.

The color separation section 404 performs color separation as follows. Ye-, Cy-, Mg-, and Gr-components on the scanning line ① are assumed to be the same as respective Ye, Cy, Gr and Mg-components on the scanning line ② neighboring the scanning line ①, although each pair of components have different positions. Under this assumption, Ye-, Cy-, Mg-, and Gr-components are separated. The separate Ye-, Cy-, Mg-, and Gr-components are converted to three primary colors, i.e., R-, G-, and B-components in accordance with expression (6) above in groups of eight pixels, for example.

Based on the R-, G-, and B-components obtained by the conversion of the color separation section 404, the white balance adjusting section (WB) 405 adjusts white-balance in accordance with the color temperature of illumination so as to correct the color of an image.

The gamma correction section 406 subjects image data output from the white balance adjusting section (WB) 405 to gamma correction.

The color difference matrix section 407 calculates a low-frequency luminance signal Y2 (also called a constant luminance signal Y2) based on the R-, G-, and B-components in accordance with expression (8) below, and calculates color difference signals Cr and Cb in accordance with expression (9) below.

$$Y2=0.3R+0.59G+0.11B \quad (8)$$

$$Cr=R-Y2$$

$$Cb=B-Y2 \quad (9)$$

The constant luminance processing section 408 replaces a low frequency portion of the broad frequency luminance component Y1 which has been subjected to gamma correction in the gamma correction section 403 with a low-frequency luminance signal Y2. This processing is referred to as constant luminance processing.

The adder 409 adds a horizontal-vertical contour emphasizing processing signal output from the horizontal-vertical contour emphasizing section 401 to a luminance signal output from the constant luminance processing section 408, and outputs the resultant signal as a luminance signal Y.

As described above, the signal processing system 400 of the color video camera reads out image data by adding pixel data on two scanning lines as shown in FIG. 15, so that a resolution is reduced. Nevertheless, a problem substantially does not arise, since the resolution of a display is as low as the resolution of the video camera. In the case of a digital still camera requiring a higher resolution, the signal processing system needs to read out pixel data for every scanning line.

For a complementary-color filter array as shown in FIG. 15 or 2, an actual sampling frequency is set to $fs=1/\Delta x=1/\Delta y$ where $\Delta X$ represents a width of a pixel (pixel pitch) in a horizontal direction (x-direction), and $\Delta y$ represents a width of a pixel (pixel pitch) in a vertical direction (y-direction).

According to sampling theorem, the highest frequency of spatial frequencies contained in an original image, which can be restored, is half the sampling frequency fs ($=1/\Delta x=1/\Delta y$). Therefore, frequency components higher than the highest restorable frequency fs/2 appear as noise.

To avoid such a problem, an optical low-pass filter (anti-aliasing filter) is attached to a CCD area sensor. The optical low-pass filter cuts out frequency components higher than or equal to fs/2. Unfortunately, the optical low-pass filter is not ideal, so that frequency components lower than or equal to fs/2 are attenuated. Referring to FIG. 8, graph a shows a frequency characteristic of an ideal low-pass filter (for cutting out frequency components higher than or equal to fs/2). However, an actual low-pass filter has a frequency characteristic as shown by graph b. Graph c shows a frequency characteristic of a desired compensation filter for restoring high-range luminance components which are attenuated by the low-pass filter to approach the ideal frequency characteristic represented by graph a. In the present invention, a compensation filter having a frequency characteristic substantially represented by graph D1 is used to newly extract a middle-high-range luminance component and combine it with middle and high-range luminance components at a predetermined ratio. The term "middle-high-range" as used herein refers to an intermediate range between a middle range and a high range in a region less than or equal to the sampling frequency fs.

When for each pixel of the complementary-color filter array of FIG. 2, three color components are estimated using interpolation, high-range luminance components are attenuated. Therefore, compensation of the attenuated high-range luminance components is essential so as to produce a sharp image. Typically, as shown in FIG. 9, such compensation is carried out by a combination of a frequency characteristic of a middle-range luminance component compensating filter (graph d) and a frequency characteristic of a high-range luminance component compensating filter (graph c). In FIG. 9, graph b represents a total frequency characteristic after a low-pass filter (anti-aliasing filter) and interpolation, and graph a represents an ideal frequency characteristic of an entire image processing system including compensation.

In the above-described conventional technique, a middle-range luminance component and a high-range luminance component are compensated for by the frequency characteristic curve (graph d) of the middle-range luminance component compensating filter and the frequency characteristic curve (graph c) of the high-range luminance component compensating filter of FIG. 9. A maximum amplitude of graph d is positioned at an angular frequency $\omega=\pi/2$ (corresponding to fs/4). A maximum amplitude of graph a is positioned at an angular frequency $\omega=\pi$ (corresponding to fs/2). Therefore, the middle-range luminance component is compensated for by graph d having the maximum amplitude at an angular frequency $\omega=\pi/2$ while the high-range luminance component is compensated by graph c having the maximum amplitude at an angular frequency $\omega=\pi$.

However, when high-range luminance components in an image are emphasized by the high-range luminance component compensation in contour emphasizing processing for sharpening an image, noise components are also emphasized. Therefore, all components having an angular frequency $\omega$ higher than $\pi$ (corresponding to fs/2) are noise. As a result, when the resolution of an image is increased, noise and jaggy components are made conspicuous. Jaggy refers to one kind of noise which is substantially the most conspicuous of various kinds of noise. Jaggy (or zip noise) in the shape of steps appears at a contour portion.

SUMMARY OF THE INVENTION

According to one aspect of the present invention, an image processing apparatus for processing complementary color image data output from an image capturing element including a complementary-color filter, comprises a middle-high-range luminance component compensation section for compensating for a middle-high-range luminance component of a low-frequency luminance signal generated based on the complementary color image data such that the low-frequency luminance signal has substantially an ideal frequency characteristic which is lower than or equal to a predetermined frequency. As used herein, a "middle-high range luminance component" means a luminance component mainly containing middle-high range components, and a "low-frequency luminance signal" means a luminance signal mainly containing low-frequency components.

With the above-described structure, a middle-high-range luminance component in a low-frequency luminance signal which is attenuated from an ideal frequency characteristic of a low-pass filter in a range of lower than or equal to a predetermined frequency (half of the sampling frequency, i.e., fs/2) is compensated for. Therefore, noise and jaggy occurring in sharpening processing can be suppressed.

According to another aspect of the present invention, an image processing apparatus for processing complementary color image data output from an image capturing element including a complementary-color filter, comprises a middle-high-range luminance component extraction section for extracting a middle-high-range luminance component having a zero amplitude at an angular frequency $\omega=\pi$ and a maximum amplitude at an angular frequency $\omega$ between $\pi/2$ and $\pi$ from a first luminance signal generated based on complementary color image data of four neighboring pixels, and a first synthesis section for adding the middle-high-range luminance component to a low-frequency luminance signal generated based on the complementary color image data to generate a second luminance signal.

With the above-described structure, a middle-high-range luminance component is compensated for, thereby obtaining images having a high resolution. In addition, noise and jaggy occurring in sharpening processing can be suppressed.

In one embodiment of this invention, the middle-high-range luminance component extraction section uses at least one even-number-size filter to arithmetically process the first luminance signal.

With the above-described structure, a middle-high-range luminance component having the zero amplitude at an angular frequency $\omega=\pi$ and the maximum amplitude at an angular frequency $\omega$ between $\pi/2$ and $\pi$ can be easily obtained.

In one embodiment of this invention, the even-number-size filter is a two-dimensional filter, and has coefficients symmetrical with respect to a x-direction and a y-direction.

With the above-described structure, a uniform effect of filtering processing can be obtained, thereby making it possible to faithfully reproduce images.

In one embodiment of this invention, the even-number-size filter includes a first low-pass filter having a differentiation capability and a second low-pass filter, and a difference between an output obtained by arithmetically processing the first luminance signal using the first low-pass filter and an output obtained by arithmetically processing the first luminance signal using the second low-pass filter is output as the middle-high-range luminance component.

With the above-described structure, operations in the x-direction and the y-direction can be separately performed, thereby reducing calculation scale. Therefore, the present invention can be easily realized by hardware.

In one embodiment of this invention, the image processing apparatus further comprises a first luminance signal generation section for generating the first luminance signal by adding complementary color image data from four neighboring pixels out of the complementary color image data together.

Complementary color data are added together by the complementary-color filter in groups of four neighboring pixels to obtain a middle-high-range luminance component extracting luminance signal Yin. Therefore, losses in high-range luminance components can be suppressed, thereby making it possible to obtain sharp images.

In one embodiement of this invention, the image processing apparatus further comprises an interpolation section for calculating missing components for each pixel having Ye-, Cy-, Mg-, or Gr-component by interpolation to obtain a complementary image signal before the low-frequency luminance signal is generated. The interpolation section calculates missing components by arithmetically processing the complementary color image data using an odd-number-size filter.

With the above-described structure, when a middle-high-range luminance component of a low-frequency luminance signal is compensated for, the center of the middle-high-range luminance component is positioned at the center of each pixel. Therefore, the low-frequency luminance signal needs to be positioned at the center of each pixel. Otherwise, ghosts occur in reproduced images.

In one embodiment of this invention, the image processing apparatus further comprises an RGB generation section provided at a subsequent stage of the interpolation section, for generating R, G and B image signals based on the complementary color image from the interpolation section.

With the above-described structure, R, G and B image signals used in generating a low-frequency luminance signal can be easily obtained from a complementary color image signal.

In one embodiment of this invention, the RGB generation section calculates R, G and B image signals based on the complementary-color image signal output from the interpolation section in accordance with expression below:

$$\begin{pmatrix} R \\ G \\ B \end{pmatrix} = \begin{pmatrix} C_{11} & C_{12} & C_{13} & C_{14} \\ C_{21} & C_{22} & C_{23} & C_{24} \\ C_{31} & C_{32} & C_{33} & C_{34} \end{pmatrix} \begin{pmatrix} Ye \\ Cy \\ Gr \\ Mg \end{pmatrix}$$

With the above-described structure, variations in characteristics of image capturing elements among manufacturers can be accommodated by adjusting the parameters Cij of the above-described expression.

In one embodiment of this invention, the image processing apparatus further comprises a middle-range luminance extraction section for extracting a middle-range luminance component based on the second luminance signal, a high-range luminance extraction section for extracting a high-range luminance component based on the second luminance signal, and a second synthesis section for adding at least one of the middle and high-range luminance components to the second luminance signal to generate a third luminance signal.

With the above-described structure, by modifying a ratio of a middle-range luminance component to a high-range luminance component, the three-dimensional appearance (stereoscopic or stereophonc effect) of an image can be adjusted depending on user's preference.

In one embodiment of this invention, the image processing apparatus further comprises a median filtering section for removing noise contained in a color difference signal generated based on the complementary color image data. The median filtering section includes a plurality of median filters having different sizes, the sizes of the median filter are switched depending on an amount of change in the color difference signal.

With the above-described structure, median filters having different sizes are selected and used depending on the amount of change in a color difference signal, thereby making it possible to prevent occurrence of pseudo colors.

Thus, the invention described herein makes possible the advantages of providing an image processing apparatus which, by using a complementary-color filter, can obtain a high-sensitivity image with reduced noise or jaggy occurring in sharpening processing.

These and other advantages of the present invention will become apparent to those skilled in the art upon reading and understanding the following detailed description with reference to the accompanying figures.

BRIEF DESCRIPTION OF THE DRAWINGS

FIG. 2 is a plan view showing a color array of a complementary-color filter.

FIG. 3 is a plan view showing a part of the color array of the complementary-color filter of FIG. 2.

FIG. 4 is plan view showing a specific example of a YeCyGrMg interpolation filter.

FIGS. 5A and 5B are diagrams showing specific examples of first and second YH extraction filters F1 and F2 employed in a middle-high-range luminance component extraction section of FIG. 1, respectively.

FIG. 10 is a diagram showing specific examples of filters (A) through (E) which are represented by one-dimensional filters.

FIG. 17 is a diagram showing a specific example of a single YH extraction filter employed in the middle-high-range luminance component extraction section of FIG. 1.

DESCRIPTION OF THE PREFERRED EMBODIMENTS

Hereinafter, the present invention will be described by way of illustrative examples with reference to the accompanying drawings.

Figure 1:
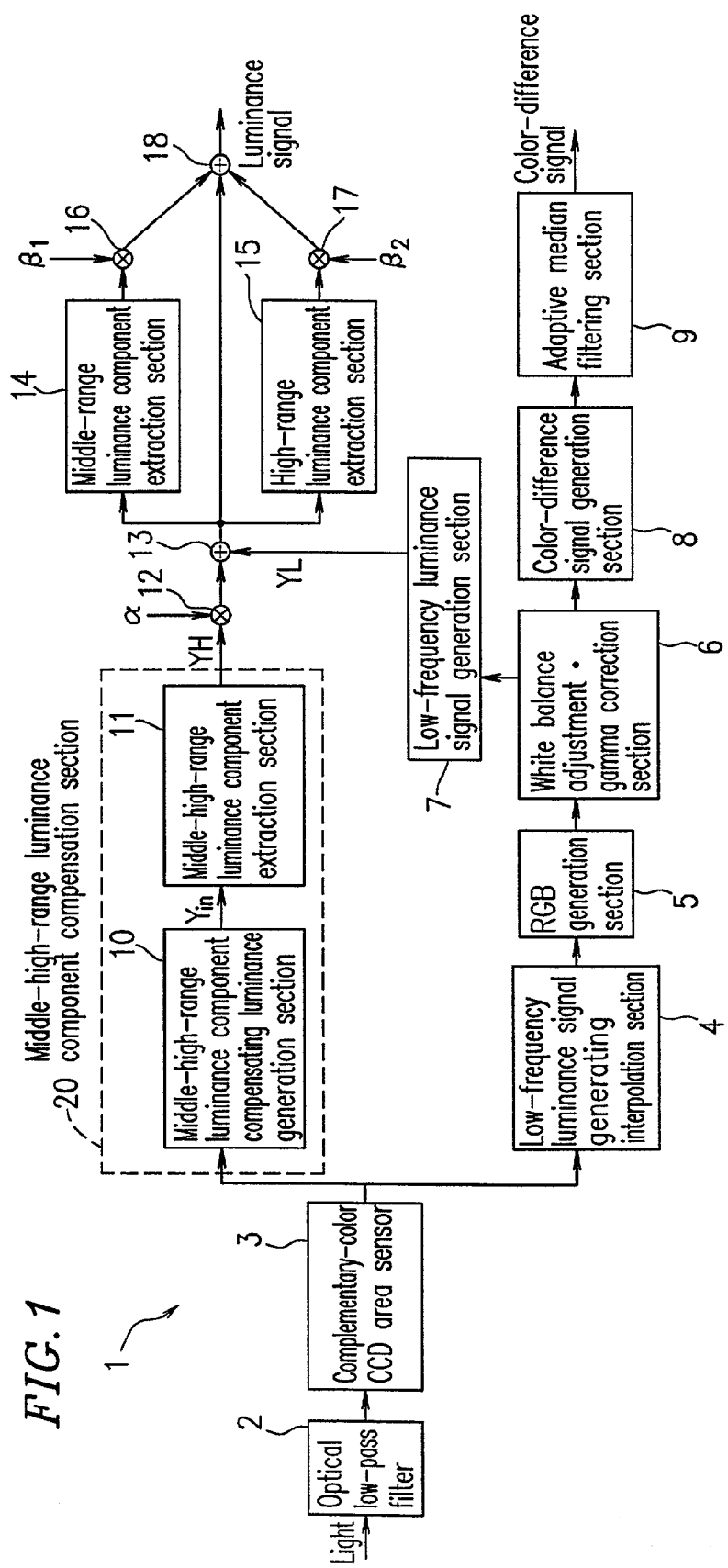
FIG. 1 is a block diagram showing a configuration of an image processing apparatus according to an example of the present invention.

FIG. 1 is a block diagram showing a configuration of an image processing apparatus according to an example of the present invention. Referring to FIG. 1, an image processing apparatus 1 includes: an optical low-pass filter 2; a complementary color CCD area sensor 3; a low-frequency luminance signal generating Ye, Cy, Gr, Mg interpolation section 4 (hereinafter referred to as a low-frequency luminance signal generating interpolation section 4) for interpolating components; an RGB generation section 5; a white-balance adjustment gamma correction section 6; a low-frequency luminance signal generation section 7 (hereinafter also referred to as a constant luminance signal generation section); a color difference signal generation section 8 for generating color difference signals Cr and Cb: and an adaptive median filtering section 9.

The optical low-pass filter 2 cuts out high-range luminance components higher than or equal to ½ of an actual sampling frequency fs. The sampling frequency fs is equal to $1/\Delta x = 1/\Delta y$ where $\Delta x$ and $\Delta y$ are a pixel pitch as shown in FIG. 2.

The complementary color CCD area sensor 3 includes a plurality of light-receiving elements arrayed in a matrix, and a complementary-color filter disposed at a light-receiving element surface side thereof. The complementary-color filter has, for example, a color array as shown in FIG. 2. Image data read out from the complementary color CCD area sensor 3 is processed by a CDS circuit for reducing noise, and then by an AGC circuit for adjusting gain. The resultant image data is converted to digital image data by an A/D conversion circuit having a resolution of 10 bits, for example. The digital data is output to the low-frequency luminance signal generating interpolation section 4.

The low-frequency luminance signal generating interpolation section 4 evaluates missing components for each pixel of the image data from the complementary color CCD area sensor 3 by interpolation. FIG. 3 shows a complementary color array. For example, when a missing component is a Gr component, the missing component is evaluated by interpolation using expressions (11) through (13) below. Ye, Cy, and Mg-components each have the same arrangement pattern as that of Gr components, the same interpolation method as that for Gr components is applied.

$$Gr5 = (Gr4 + Gr6)/2 \quad (11)$$

$$Gr7 = (Gr4 + Gr10)/2 \quad (12)$$

$$Gr8 = (Gr4 + Gr6 + Gr10 + Gr12)/4 \quad (13)$$

The above-described interpolation is carried out by a YeCyGrMg interpolation filter shown in FIG. 4 included in the low-frequency luminance signal generating interpolation section 4. The YeCyGrMg interpolation filter is an odd-number-size filter having 3 pixels×3 pixels where pixel data to be interpolated is positioned at the center of the pixel.

A method for using the YeCyGrMg interpolation filter will be described below. For example, in the case of the complementary-color filter array of FIG. 3, Ye5, Cy5 and Mg5 are sequentially evaluated by the following expressions.

$$Ye5 = (1/4) \times Ye1 + (1/4) \times Ye3 + (1/4) \times Ye7 + (1/4) \times Ye9$$

$$Cy5 = (1/2) \times Cy2 + (1/2) \times Cy8$$

$$Mg5 = 1 \times Mg5$$

A reason a 3×3 pixel filter is used as the YeCyGrMg interpolation filter is that the use of a filter having more than 3 pixels×3 pixels in interpolation may lead to a reduction in resolution and color reproductivity. Moreover, interpolation cannot be carried out using a filter having a size of 1 pixel×1 pixel. Therefore, a filter having a size of 3 pixels×3 pixels is most preferable. A reason for the use of an odd-number-size filter will be described later.

The RGB generation section 5 generates R, G and B image signals including respective primary colors (R, G and B) which are calculated in groups of 8 pixels in accordance with expression (14) below based on Ye-, Cy-, Mg-, and Gr-components of a complementary color image signal including components obtained by interpolation in the low-frequency luminance signal generating interpolation section 4.

$$Ye=R+G, Cy=G+B, Mg=R+B, Gr=G \quad (14)$$

The white-balance adjustment gamma correction section 6 subjects the R, G and B image signals to white-balance adjustment which is carried out in accordance with the color temperature of illumination so as to correct the color of an image, and subjects the resultant R, G and B image signals to gamma correction.

The low-frequency luminance signal generation section 7 calculates a predetermined-weighted sum of the R, G and B image signals obtained by the RGB generation section 5 to generate a low-frequency luminance signal YL. In this example, the low-frequency luminance signal YL is calculated based on the R, G and B image signals in accordance with expression (15) below. In the present invention, as is different from the signal processing system of the color video camera described in the DESCRIPTION OF THE RELATED ART section, interpolation is carried out for each pixel, so that the generated low-frequency luminance signal YL has a higher resolution.

$$YL=0.3R+0.59G+0.11B \quad (15)$$

The color difference signal generation section 8 calculates the color difference signals Cr and Cb based on the R-, G-, and B-components in accordance with expression (16) below. Since interpolation is carried out for each pixel, the resultant color difference signals Cr and Cb have low color noise.

$$Cr=R-YL$$

$$Cb=B-YL \quad (16)$$

In order to suppress color noise due to the color difference signals Cr and Cb, the adaptive median filtering section 9 selects a pixel region of 5 pixels×5 pixels when variations in the color difference signals Cr and Cb are small, and selects a pixel region of 3 pixels×3 pixels (a total of 9 pixels) when variations in the color difference signals Cr and Cb are large, and processes the color difference signals Cr and Cb, in accordance with expression (17) below.

When variations in the color difference signals Cr and Cb are small, a median of the color difference signals of 5 pixels×5 pixels (a total of 25 pixels) is calculated in accordance with expression (17).

The color difference signal of a pixel, which is positioned at the center of the 5 pixels×5 pixels, is replaced with the resultant median. When variations in the color difference signals Cr and Cb are large, a median of the color difference signals of 3 pixels×3 pixels (a total of 9 pixels) is calculated in accordance with expression (17). The color difference signal of a pixel, which is positioned at the center of the 3 pixels×3 pixels, is replaced with the resultant median. A pixel region is shifted by one pixel in a horizontal or vertical direction, and a similar calculation is carried out. Such processing is repeated for all pixels.

$$Cr=Median5\times5 \{Crij\}$$

$$Cb=Median5\times5 \{Cbij\}$$

$$(Max-Min) \leq Th1 \leq i, j \leq 5$$

$$Cr=Median3\times3 \{Crij\}$$

$$Cb=Median3\times3 \{Cbij\}$$

$$(Max-Min) > Th1 \leq i, j \leq 5 \quad (17)$$

In expression (17), Max is the maximum value of the color difference signals Cr and Cb in a 5×5 pixel region, and Min is the minimum value of the color difference signals Cr and Cb in the 5×5 pixel region, and Th is a threshold value.

The image processing apparatus 1 further includes: a middle-high-range luminance component compensating luminance generation section 10; a middle-high-range luminance component extraction section 11; a multiplier 12 and an adder 13 (first synthesis section); a middle-range luminance component extraction section 14; a high-range luminance component extraction section 15; and multipliers 16, 17 and an adder 18 (second synthesis section). The middle-high-range luminance component compensating luminance generation section 10 and the middle-high-range luminance component extraction section 11 constitute a middle-high-range luminance component interpolation section 20.

The middle-high-range luminance component compensating luminance generation section 10 generates a middle-high-range luminance component extraction section input luminance signal Yin (hereinafter referred to as an input luminance signal) by adding together Ye-, Cy-, Mg-, and Gr-components (complementary color image data) in groups of four pixels. Specifically, before the middle-high-range luminance component YH is extracted, the input luminance signal Yin is generated from Ye-, Cy-, Mg-, and Gr-components (complementary color image data) in groups of four neighboring pixels in accordance with expression (18) below.

$$Yin=(Ye+Cy+Gr+Mg)/4 \quad (18)$$

In this case, as can be seen from expression (18), the input luminance signal Yin is calculated using an even-number-size filter having a size of 2 pixels×2 pixels. Therefore, each pixel data is positioned between pixels.

The middle-high-range luminance component extraction section 11 extracts the middle-high-range luminance component YH from the input luminance signal Yin generated by the middle-high-range luminance component compensating luminance generation section 10 using first and second YH extraction filters F1 and F2 shown in FIGS. 5A and 5B. Specifically, the middle-high-range luminance component extraction section 11 outputs a difference between outputs of the first YH extraction filter F1 having 6 pixels×6 pixels (FIG. 5A) and the second YH extraction filter F2 having 4 pixels×4 pixels (FIG. 5B) as the middle-high-range luminance component YH. Thus, the first and second YH extraction filters F1 and F2 receive the same input. Therefore, the output of the second YH extraction filter F2 is subtracted from the output of the first YH extraction filter F1, so that high frequency components of the middle-high-range luminance component YH have low noise. In the first and second YH extraction filters F1 and F2 of FIGS. 5A and 5B, x indicates an operation in a horizontal direction while y indicates an operation in a vertical direction.

The first YH extraction filter F1 of FIG. 5A has the following features. The first YH extraction filter F1 is a low-pass filter having a differentiation capability (including negative coefficients). The x and y-directions of the first YH extraction filter F1 both have an even number size (8 pixels×8 pixels, 10 pixels×10 pixels, or the like). The shape of the first YH extraction filter F1 is preferably a square (having the same number of pixels in the x and y-direction). Alternatively, the first YH extraction filter F1 may be in the shape of a landscape (the number of pixels in the x-direction is more than that in the y-direction) in order to emphasize the x-direction, or may be in the shape of a portrait (the number of pixels in the x-direction is less than that in the y-direction) in order to emphasize the y-direction. Further, coefficients are symmetrical with respect to the x and y-directions. The second YH extraction filter F2 of FIG. 5B has the following features. The second YH extraction filter F2 is a low-pass filter (including only positive coefficients). The x and y-directions of the second YH extraction filter F2 both have even number size (which is less than or equal to the size of the first YH extraction filter F1 of FIG. 5A). The shape of the second YH extraction filter F2 is preferably a square. Alternatively, the second YH extraction filter F2 may have a rectangular shape (a landscape or a portrait). Further, coefficients are symmetrical with respect to the x and y-directions, so that an effect of filtering processing can be made uniform. Therefore, an image can be faithfully reproduced.

Figure 6:
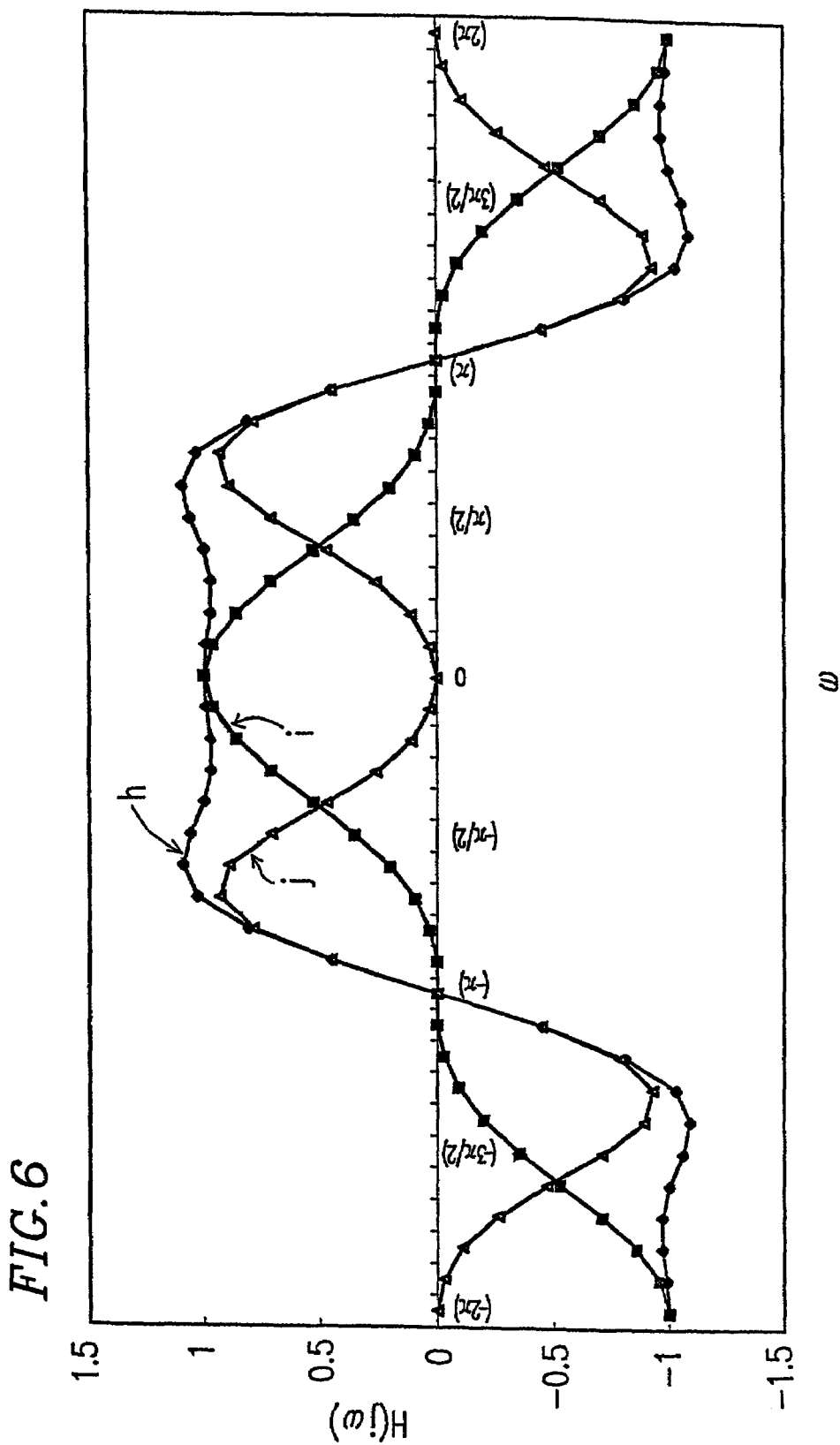
FIG. 6 is a diagram showing frequency characteristics of the first and second YH extraction filters F1 and F2 of FIGS. 5A and 5B, and a frequency characteristic of a difference between the frequency characteristics of the first and second YH extraction filters F1 and F2.

In this manner, a YH extraction filter includes two filters, so that operations in the x and y-directions can be separated. This leads to easy hardware implementation. FIG. 6 shows frequency characteristics of the first and second YH extraction filters F1 and F2 of FIGS. 5A and 5B, and a frequency characteristic of a difference between the frequency characteristics of the first and second YH extraction filters F1 and F2. In FIG. 6, graph h represents a frequency characteristic of the first YH extraction filter F1, graph i represents a frequency characteristic of the second YH extraction filter F2, graph j represents a frequency characteristic of the middle-high-range luminance component YH which is a difference signal between graph h and graph i. In this example, although the YH extraction filter includes two filters, the YH extraction filter may include only one filter. In this case, filter coefficients are as shown in FIG. 17 and calculation scale is increased.

The multiplier 12 subjects the middle-high-range luminance component YH extracted by the middle-high-range luminance component extraction section 11 to auxiliary compensation in which the middle-high-range luminance component YH is multiplied by a gain a which is an adjustable coefficient.

The adder 13 adds the middle-high-range luminance component αYH (YH multiplied by the predetermined gain α) to the low-frequency luminance signal YL from the low-frequency luminance signal generation section 7 to a luminance signal (YL+αYH).

Figure 7A:
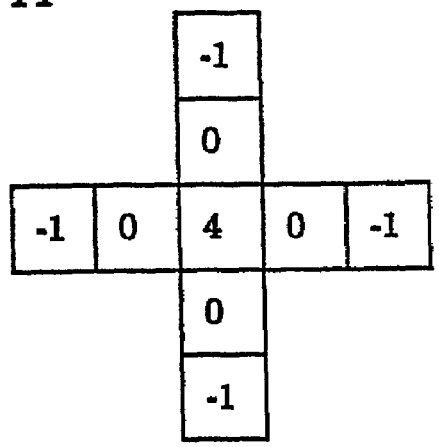
FIGS. 7A and 7B are diagrams showing a specific example of a middle-range luminance component extracting filter and a specific example of a high-range luminance component extracting filter, respectively.

The middle-range luminance component extraction section 14 extracts a middle-range luminance component ENH1 from the luminance signal (YL+αYH). The middle-range luminance component extraction section 14 employs a middle-range luminance component extracting filter as shown in FIG. 7A, for example.

Figure 7B:
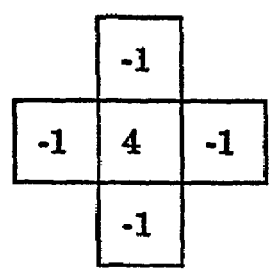

The high-range luminance component extraction section 15 extracts a high-range luminance component ENH2 from the luminance signal (YL+αYH). The high-range luminance component extraction section 15 employs a high-range luminance component extracting filter as shown in FIG. 7B, for example. The high-range luminance component extracting filter and the middle-range luminance component extracting filter may share a single filter using the same or different regions. Alternatively, two filters may be separately used, i.e., one is for extracting high-range luminance components while the other is for extracting middle-range luminance components.

The multiplier 16 subjects the middle-range luminance component ENH1 to auxiliary compensation in which the middle-range luminance component ENH1 is multiplied by a gain β1 which is an adjustable coefficient.

The multiplier 17 subjects the high-range luminance component ENH2 to auxiliary compensation in which the high-range luminance component ENH2 is multiplied by a gain β2 which is an adjustable coefficient.

The adder 18 synthesizes the luminance signal (YL+αYH) from the adder 13, the middle-range luminance component (β1ENH1) from the adder 16, and the high-range luminance component (β2ENH2) from the multiplier 17 to perform contour emphasizing processing, thereby further improving the resolution of an image.

Hereinafter, the principle of the present invention will be described in more detail.

Figure 8:
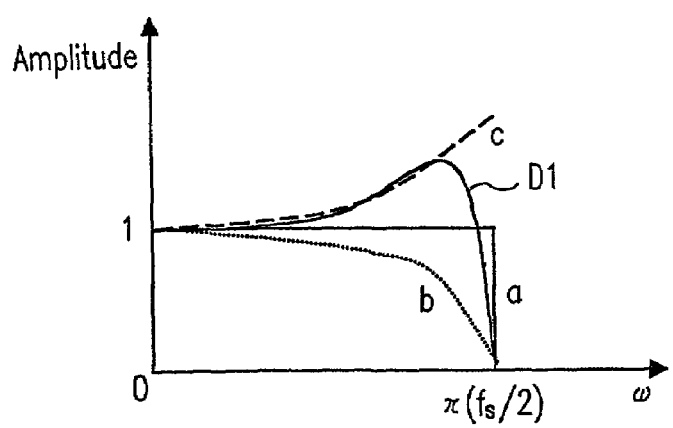
FIG. 8 is a diagram showing frequency characteristics of an optical low-pass filter and a compensation filter.

An improvement in resolution will be discussed using a one-dimensional model. The optical low-pass filter 2 is provided at a light-receiving element surface side of the complementary color CCD area sensor 3 in order to suppress aliasing noise (FIG. 1). FIG. 8 shows an influence of the optical low-pass filter 2 on an frequency characteristic of image data. In FIG. 8, graph a represents an ideal frequency characteristic of the optical low-pass filter 2, and graph b represents an actual frequency characteristic of the optical low-pass filter 2. Graph a shows an ideal frequency characteristic of a desired compensation filter for overcoming reductions in middle and high-range luminance components as shown by graph b. In the present invention, a compensation filter having a frequency characteristic substantially represented by graph D1 is used to newly extract a middle-high-range luminance component and combine it with middle to high-range luminance components at a predetermined ratio.

Figure 9:
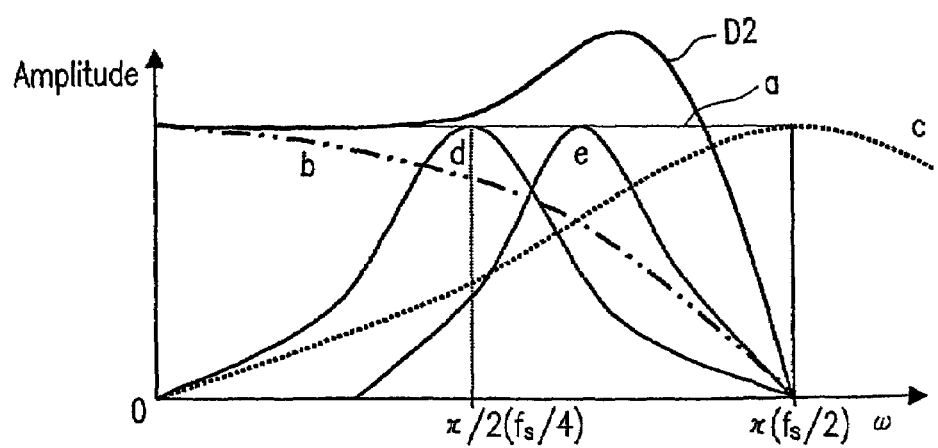
FIG. 9 is a diagram showing frequency characteristics of filters compensating for middle-range luminance components, middle-high-range luminance component, and high-range luminance components.

FIG. 9 shows frequency characteristics of filters compensating for middle-range luminance components, middle-high-range luminance components, and high-range luminance components. In FIG. 9, graph D2 represents a target frequency characteristic corresponding to that represented by graph D1 of FIG. 8. Graph b represents a frequency characteristic of an image signal where middle-range to high-range luminance components are attenuated by influences of the optical low-pass filter 2 and interpolation. Graph c represents a frequency characteristic of a high-range luminance component compensating filter (FIG. 7B). Graph d represents a frequency characteristic of a middle-range luminance component compensating filter (FIG. 7A). Graph e represents a frequency characteristic of a middle-high-range luminance component compensating filter (FIGS. 5A and 5B). The middle-high-range luminance component compensating filter (FIG. 5A and 5B) is used as main emphasizing means, while the high-range luminance component compensating filter (FIG. 7B) and the middle-range luminance component compensating filter (FIG. 7A) are used as auxiliary compensating means.

Figure 10:
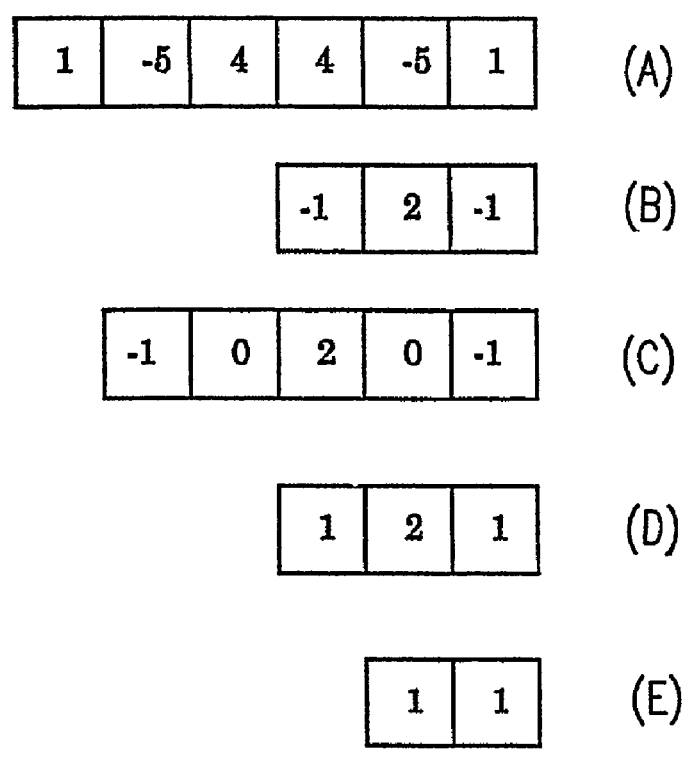

To discuss a transfer characteristic of an image processing apparatus quantitatively, the above-described two-dimensional filters are converted to one-dimensional equivalent filters (A) through (E) as shown in FIG. 10 for the sake of explanation.

The first and second two-dimensional YH extraction filters F1 and F2 of FIGS. 5A and 5B can be converted to a one-dimensional filter (A) of FIG. 10. A transfer function of the one-dimensional filter (A) of FIG. 10 is represented by $$H(z) = z^{-2.5} - 5z^{-1.5} + 4z^{-0.5} + 4z^{0.5} - 5z^{1.5} + z^{2.5} \quad (19)$$
$$= 8\cos(0.5\omega) - 10\cos(1.5\omega) + 2\cos(2.5\omega)$$

where $z=e^{j\omega}=\cos(\omega)+j\sin(\omega)$ and $\omega=2\pi f$.

The two-dimensional high-range luminance component extracting filter of FIG. 7B can be converted to a one-dimensional filter (B) of FIG. 10. A transfer function of the one-dimensional filter (B) of FIG. 10 is represented by $$H(z) = -z^{-1} + 2 - z = 2 - 2\cos(\omega). \quad (20)$$

The two-dimensional middle-range luminance component extracting filter of FIG. 7A can be converted to a one-dimensional filter (C) of FIG. 10. A transfer function of the one-dimensional filter (C) of FIG. 10 is represented by $$H(z) = -z^{-2} + 2 - z^2 = 2 - 2\cos(2\omega). \quad (21)$$

The two-dimensional filter for YeCyGrMg interporation of FIG. 4 can be converted to a one-dimensional filter (D) of FIG. 10. A transfer function of the one-dimensional filter (D) of FIG. 10 is represented by $$H(z) = z^{-1} + 2 + z = 2 + 2\cos(2\omega). \quad (22)$$

The two-dimensional filter for obtaining the input luminance signal Yin can be converted to a one-dimensional filter (E) of FIG. 10. A transfer function of the one-dimensional filter (E) of FIG. 10 is represented by $$H(z) = +z^{-0.5} + z^{0.5} = 2\cos(0.5\omega). \quad (23)$$

Figure 11:
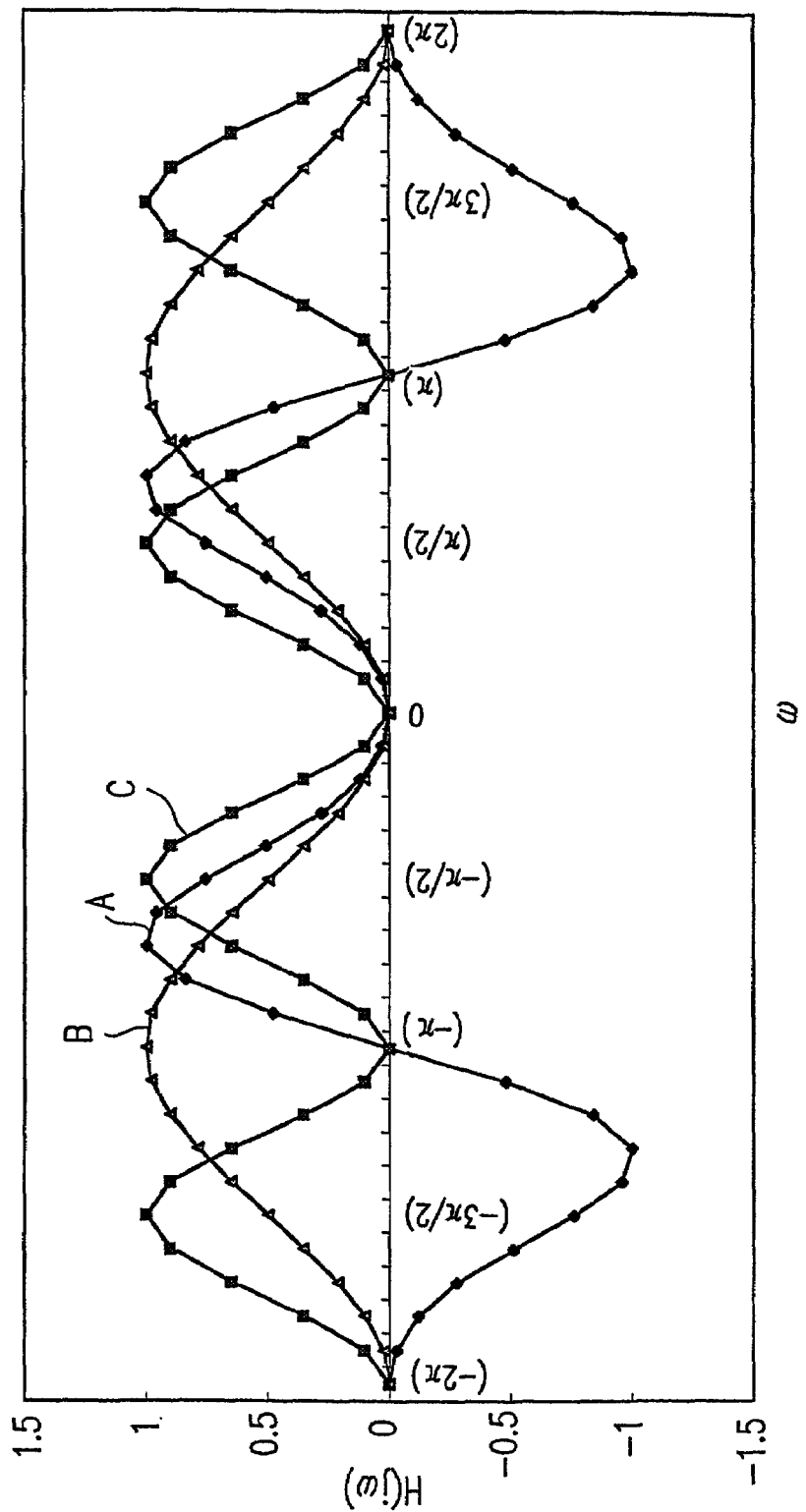
FIG. 11 is a diagram showing frequency characteristics of a middle-high-range luminance component extracting filter, a high-range luminance component extracting filter, and a middle-range luminance component extracting filter.

FIG. 11 shows frequency characteristics of expression (19) for the one-dimensional middle-high-range luminance component extracting filter (A) of FIG. 10, expression (20) for the high-range luminance component extracting filter (B) of FIG. 10 and expression (21) for the middle-range luminance component extracting filter (C) of FIG. 10. In FIG. 11, graph A represents a frequency characteristic of the middle-high-range luminance component extracting filter (A) of FIG. 10, graph B represents a frequency characteristic of the high-range luminance component extracting filter (B) of FIG. 10, and graph C represents a frequency characteristic of the middle-range luminance component extracting filter (C) of FIG. 10. For the sake of comparison, graphs A through C are normalized.

Figure 12:
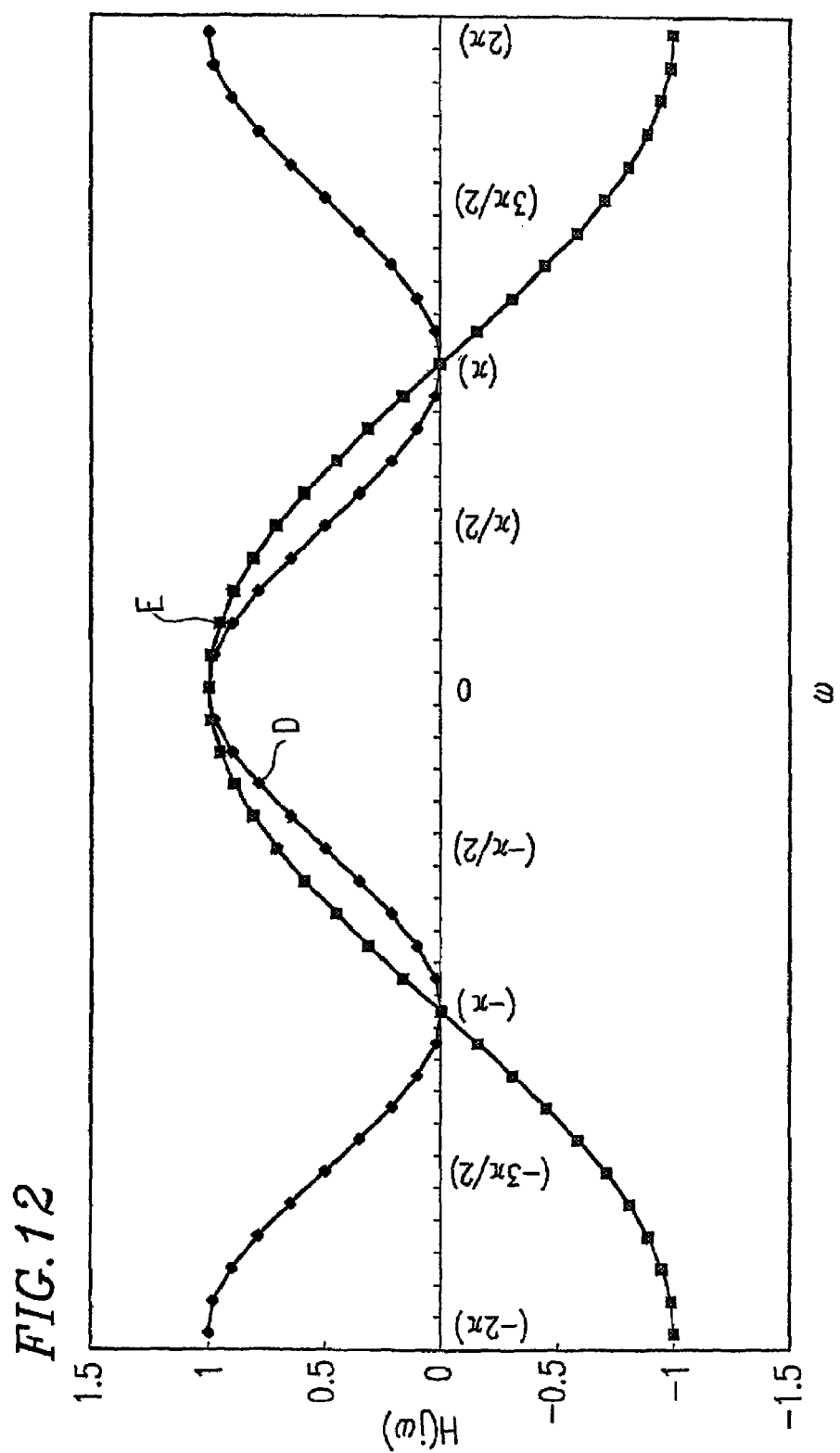
FIG. 12 is a diagram showing frequency characteristics of a low-frequency luminance signal YL and an input luminance signal Yin of the present invention.

FIG. 12 shows frequency characteristics of expression (22) for the one-dimensional low-frequency luminance signal generating interpolation filter (D) of FIG. 10, and expression (23) for the YH extraction filter (E) of FIG. 10. In FIG. 12, graph D represents a frequency characteristic of the low-frequency luminance signal generating interpolation filter (D) of FIG. 10, and graph E represents a frequency characteristic of the YH extraction filter (E) of FIG. 10.

Figure 13:
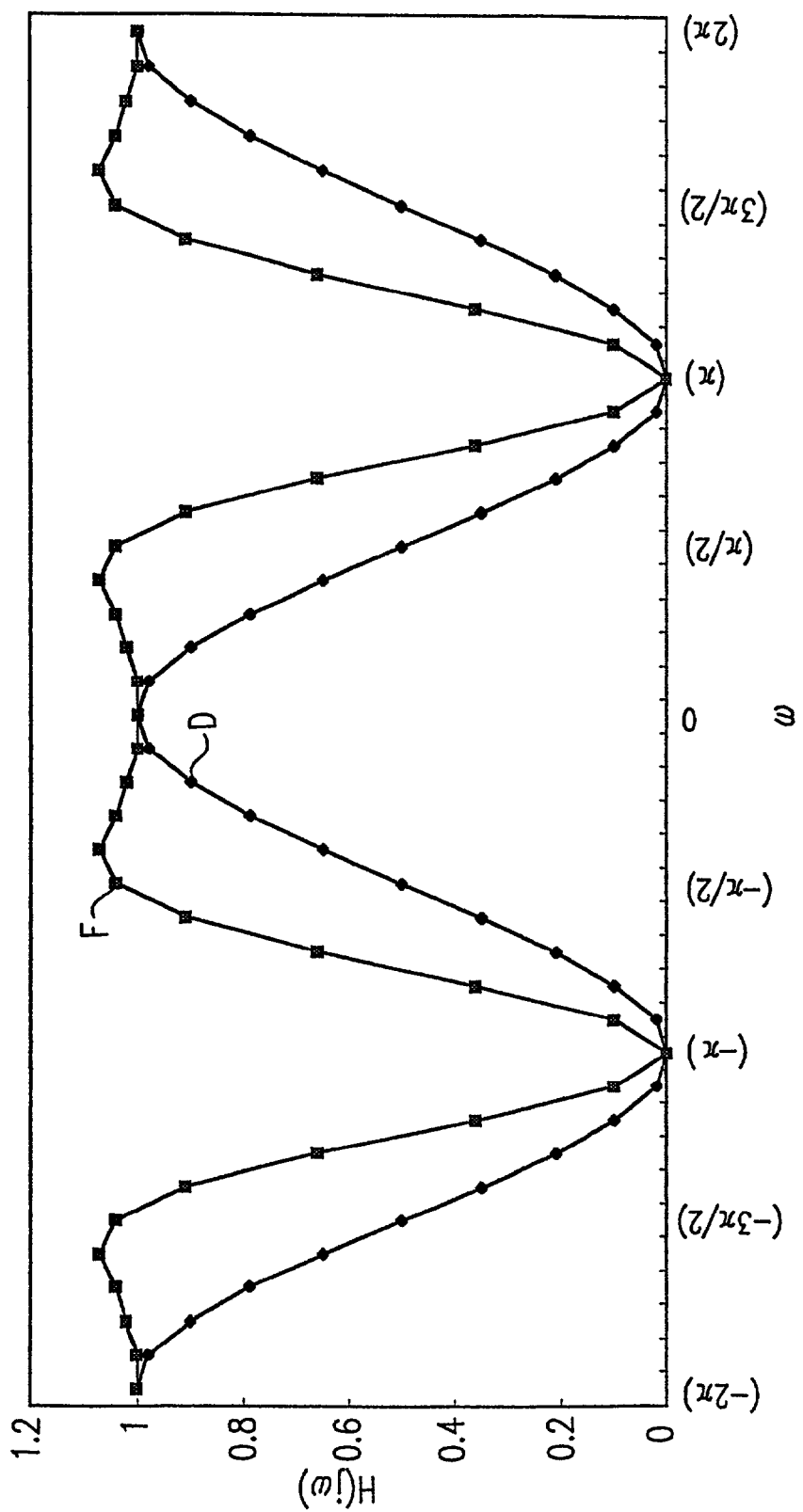
FIG. 13 is a diagram showing frequency characteristics of a low-frequency luminance signal YL and a luminance signal (YL+YH) after a middle-high range luminance component is compensated for, of the present invention.

FIG. 13 shows graph F representing a frequency characteristic of a luminance signal (YL+YH) obtained by compensating for the low-frequency luminance signal YL with the middle-high-range luminance component YH, and also shows again, for comparison, graph D representing a frequency characteristic of the low-frequency luminance signal YL.

Figure 14:
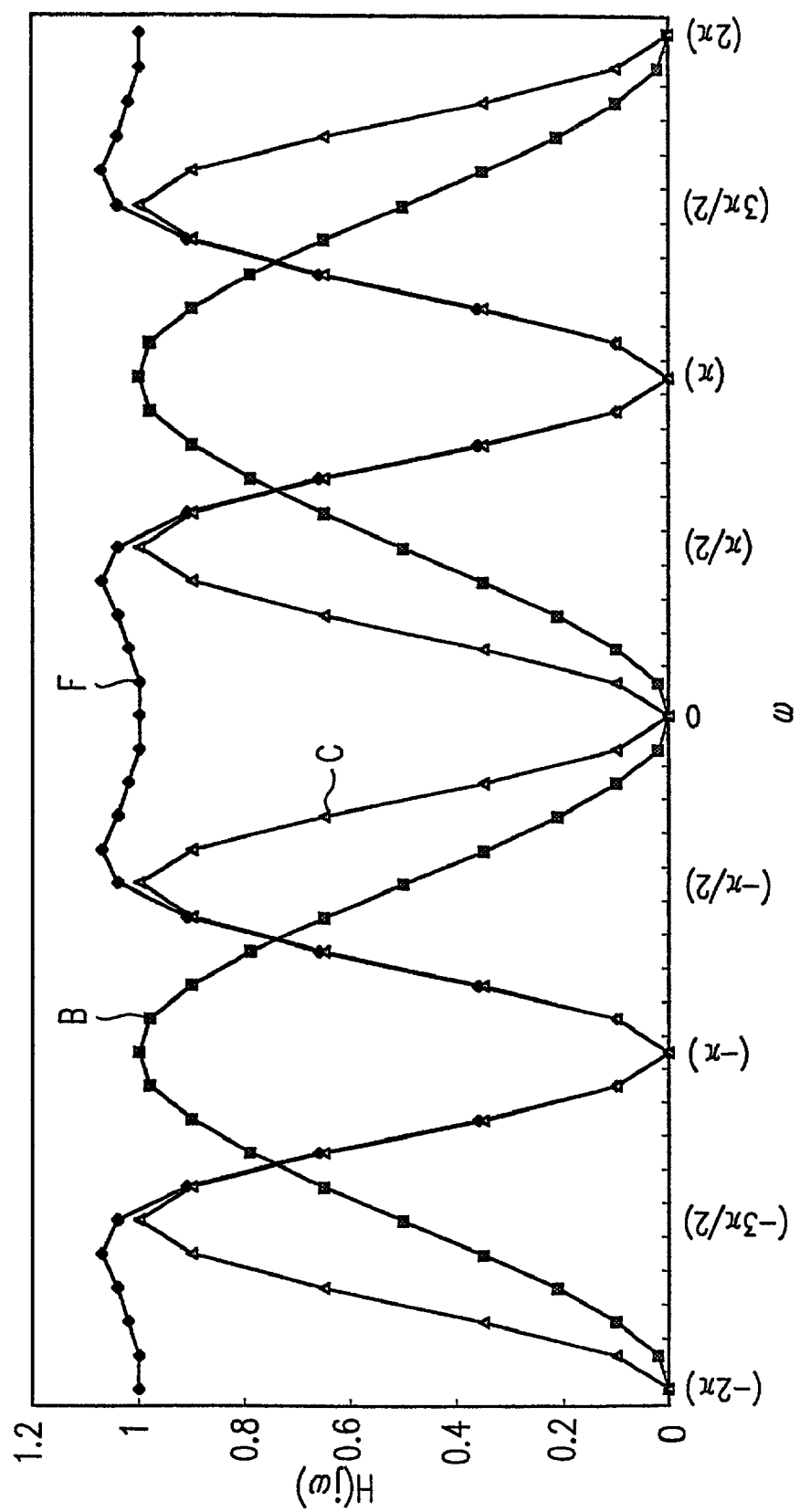
FIG. 14 is a diagram showing frequency characteristics of a luminance signal (YL+YH), a high-range luminance component compensating filter, and a middle-range luminance component compensating filter of the present invention.
Figure 15:
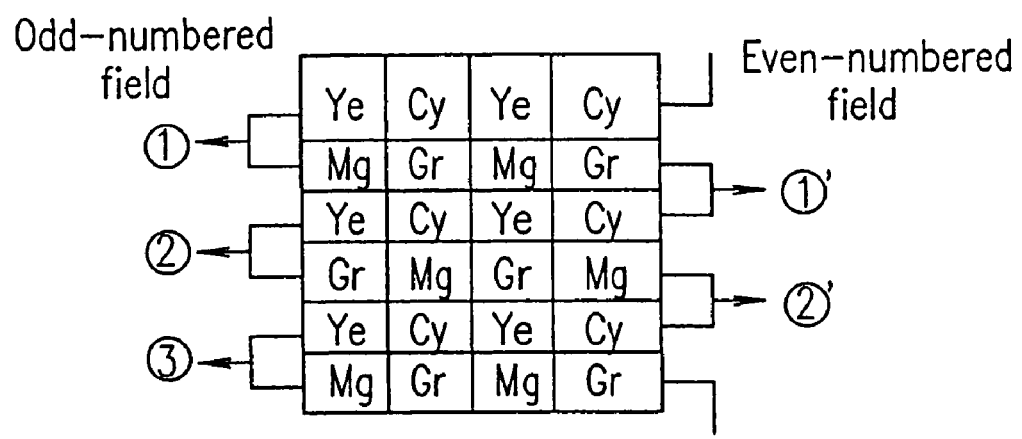
FIG. 15 is a plan view showing an array of a complementary-color filter for a video camera.
Figure 16:
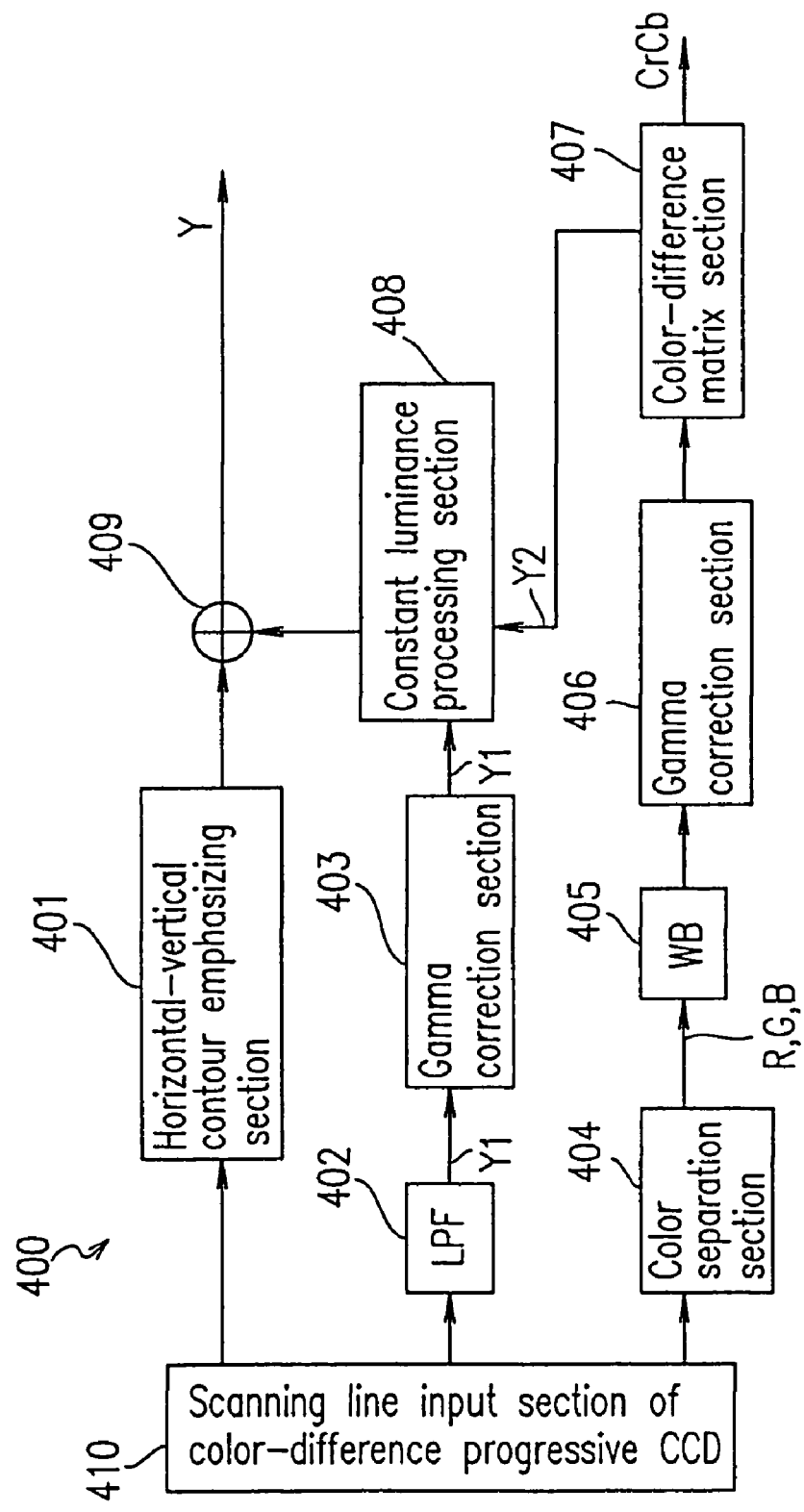
FIG. 16 is a block diagram showing an exemplary configuration of a signal processing system of a conventional color video camera.

FIG. 14 shows graph F representing a frequency characteristic of the luminance signal (YL+YH), graph B representing a frequency characteristic of the high-range luminance component compensating filter (B) of FIG. 10, and graph C representing a frequency characteristic of the middle-range luminance component compensating filter. Adjustment of the gains α, β1 and β2 (adjustable coefficients) of FIG. 1 allows graph F to approach graph D2 of FIG. 9 which is the target frequency characteristic. In this case, the luminance signal (YL+YH) is subjected to the middle-range luminance component compensation and the high-range luminance component compensation, rather than the middle-high-range luminance component YH. This is because the luminance signal (YL+YH) has an S/N ratio higher than that of the middle-high-range luminance component YH.

A luminance signal extracted by the optical low-pass filter 2 is compensated for mainly by the middle-high-range luminance component compensating filter having a frequency characteristic represented by graph e of FIG. 9, and subordinately by the middle-range luminance component compensating filter having a frequency characteristic represented by graph d and the high-range luminance component compensating filter having a frequency characteristic represented by graph c. A frequency characteristic of a filter capable of compensating for the middle-high-range luminance component needs to have the maximum amplitude at an angular frequency ω between π/2 to π and zero amplitude at an angular frequency ω=π. An even-number-size filter as represented in graph A of FIG. 11 can meet such conditions.

An odd-number-size filter is herein used as the YeCyGrMg interpolation filter of the low-frequency luminance signal generating interpolation section 4 for the following reason. When the middle-high-range luminance component YH is added to the low-frequency luminance signal YL in the adder 13, positions of pixel data need to be aligned with each other. Specifically, as described above, the YH extraction filter of the middle-high-range luminance component extraction section 11 needs to have an even number size as described above. Moreover, the filter of the middle-high-range luminance component compensating luminance generation section 10 also has an even number size (2 pixels×2 pixels). Therefore, pixel data extracted by the middle-high-range luminance component YH is positioned at the center of each pixel. In this case, if the YeCyGrMg interpolation filter of the low-frequency luminance signal generating interpolation section 4 has an odd number size, pixel data of the low-frequency luminance signal YL can also be positioned at the center of each pixel.

According to the above-described configuration, incoming light is subjected to sampling by the optical low-pass filter 2 so that the frequency components of the incoming light higher than or equal to ½ of the sampling frequency fs is cut out from the incoming light. The resultant light enters via a complementary-color filter to the complementary color CCD area sensor 3. Image data is read out from the complementary color CCD area sensor 3, missing components are obtained by interpolation of the image data by the low-frequency luminance signal generating interpolation section 4. The RGB generation section 5 generates R, G and B image signals including R-, G-, and B-components based on Ye-, Cy-, Mg-, and Gr-components which are complementary color image signals. Further, the R, G and B image signals are subjected to white-balance adjustment and then gamma correction. Based on the resultant signals, the low-frequency luminance signal generation section 7 generates the low-frequency luminance signal YL.

Further, based on the gamma-corrected R, G and B image signals the color difference signal generation section 8 calculates the color difference signals Cr and Cb. Thereafter, the adaptive median filtering section 9 selects a 5×5 pixel region when variations in the color difference signals Cr and Cb are small and selects a 3×3 pixel region when variations in the color difference signals Cr and Cb are large, and subjects the color difference signals Cr and Cb to the adaptive median filtering processing, in accordance with expression (17), thereby removing noise from the color difference signals Cr and Cb and therefore preventing pseudo colors.

On the other hand, the middle-high-range luminance component compensating luminance generation section 10 generates the input luminance signal Yin by adding Ye-, Cy-, Mg-, and Gr-components together in groups of four pixels. The middle-high-range luminance component extraction section 11 extracts the middle-high-range luminance component YH from the input luminance signal Yin using the middle-high-range luminance component extracting filter which is an even-number-mask-size band-pass filter. Further, the middle-high-range luminance component YH extracted by the middle-high-range luminance component extraction section 11 is multiplied by the gain a. The gain-adjusted middle-high-range luminance component $\alpha$YH is added to the low-frequency luminance signal YL output from the low-frequency luminance signal generation section 7, thereby obtaining the luminance signal (YL+$\alpha$YH).

Further, the middle-range luminance component extraction section 14 extracts the middle-range luminance component ENH1 from the luminance signal (YL+$\alpha$YH). The high-range luminance component extraction section 15 extracts the high-range luminance component ENH2 from the luminance signal (YL+$\alpha$YH). The middle-range luminance component ENH1 is multiplied by the gain $\beta$1 while the middle-range luminance component ENH2 is multiplied by the gain $\beta$2. Thereafter, in the adder 18, the high-range luminance component $\beta$1ENH1 and the middle-range luminance component $\beta$2ENH2 are synthesized with the luminance signal (YL+$\alpha$YH). Therefore, the luminance signal (YL+$\alpha$YH) having a high S/N ratio is subjected to middle-range luminance component compensation and high-range luminance component compensation, whereby a sharper luminance signal is finally output.

As described above, according to this example, a complementary color image signal is converted to R, G and B image signals by the RGB generation section 5. Based on the R, G and B image signals, the low-frequency luminance signal generation section 7 generates the low-frequency luminance signal YL for each pixel. To the low-frequency luminance signal YL is added the middle-high-range luminance component YH extracted from the input luminance signal Yin by the middle-high-range luminance component extraction section 11. Therefore, the resultant image data can have color reproductivity higher than that of the color video camera using a complementary-color filter. Further, middle-high-range luminance components attenuated by the optical low-pass filter 2 and interpolation are compensated for. In addition, the middle-range luminance component extraction section 14 and high-range luminance component extraction section 15 are used to perform contour emphasizing processing, thereby making it possible to perform auxiliary compensation using a conventional compensation technique. Therefore, noise and jaggy occurring in sharpening processing can be efficiently suppressed. As a result, digital still images obtained in accordance with the principle of the present invention can be sharper images with low noise, jaggy, and pseudo colors, and have high resolution and color reproductivity.

In this example, the RGB generation section 5 converts a complementary color image signal (i.e., Ye-, Cy-, Mg-, and Gr-components) to three primary color (R, G and B) components in accordance with Ye=R+G, Cy=G+B, Mg=R+B, and Gr=G in groups of eight pixels. The present invention is not limited to this. Alternatively, the complementary color image signal (i.e., Ye-, Cy-, Mg-, and Gr-components) may be converted to R-, G-, and B-components in accordance with expression (24) below. By adjusting parameters Cij in expression (24), variations in image capturing (CCD) characteristics among manufacturers can be accommodated.

$$\begin{pmatrix} R \\ G \\ B \end{pmatrix} = \begin{pmatrix} C_{11} & C_{12} & C_{13} & C_{14} \\ C_{21} & C_{22} & C_{23} & C_{24} \\ C_{31} & C_{32} & C_{33} & C_{34} \end{pmatrix} \begin{pmatrix} Ye \\ Cy \\ Gr \\ Mg \end{pmatrix} \quad (24)$$

The image processing apparatus of this example will be further described. In the image processing apparatus, a complementary color image is output via the optical low-pass filter 2 from the complementary color CCD area sensor 3. In addition, the image processing apparatus includes the middle-high-range luminance component compensation section which compensates for attenuated middle and high-range luminance components in a low-frequency luminance signal which is generated based on the complementary color image data and whose middle and high frequency components are attenuated from a frequency characteristic of an ideal low-pass filter. With this configuration, attenuated middle and high-range luminance components in a low-frequency luminance signal whose middle and high frequency components are attenuated from a frequency characteristic of an ideal low-pass filter are compensated for. As a result, image data having color reproductivity higher than that of conventional color video cameras using a complementary-color filter can be obtained. Further, noise and jaggy occurring in sharpening processing can be efficiently suppressed.

As described above, according to the present invention, a middle-high-range luminance component in a low-frequency luminance signal which is attenuated from an ideal frequency characteristic of a low-pass filter in a range of lower than or equal to a predetermined frequency (half of the sampling frequency, i.e., fs/2) is compensated for. Therefore, noise and jaggy occurring in sharpening processing can be suppressed.

According to the present invention, a middle-high-range luminance component is compensated for, thereby obtaining images having a high resolution. In addition, noise and jaggy occurring in sharpening processing can be suppressed.

According to the present invention, a middle-high-range luminance component having the zero amplitude at an angular frequency $\omega=\pi$ and the maximum amplitude at an angular frequency $\omega$ between $\pi/2$ and $\pi$ can be easily obtained.

According to the present invention, a uniform effect of filtering processing can be obtained, thereby making it possible to faithfully reproduce images.

According to the present invention, operations in the x-direction and the y-direction can be separately performed, thereby reducing calculation scale. Therefore, the present invention can be easily realized by hardware.

According to the present invention, complementary color data (i.e., Ye-, Cy-, Mg-, and Gr-components) are added together in groups of four pixels to obtain a middle-high-range luminance component extracting luminance signal Yin. Therefore, losses in high-range luminance components can be minimized, thereby making it possible to obtain sharp images.

According to the present invention, a middle-high-range luminance component of a low-frequency luminance signal is compensated for so that the center of the middle-high-range luminance component is positioned at the center of each pixel and low-frequency luminance components are positioned at the centers of pixels, thereby making it possible to prevent ghosts from occurring in reproduced images.

According to the present invention, R, G and B image signals used in generating a low-frequency luminance signal can be easily obtained from a complementary color image signal.

According to the present invention, variations in characteristics of image capturing elements among manufacturers can be accommodated by adjusting the parameters Cij of expression (24).

According to the present invention, by modifying a ratio of a middle-range luminance component to a high-range luminance component, the three-dimensional appearance of an image can be adjusted depending on user's preference.

According to the present invention, median filters having different sizes are selected and used depending on the amount of change in a color difference signal, thereby making it possible to prevent occurrence of pseudo colors.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An image processing apparatus for processing complementary color image data output from an image capturing element including a complementary-color filter, comprising:
   a signal generator for generating a low frequency luminance signal based on a complimentary color image data; and
   a middle-high-range luminance component compensation section for compensating for a middle-high-range luminance component representing an intermediate range between a middle range and a high range of a low-frequency luminance signal, generated based on the complementary color image data such that the low-frequency luminance signal has substantially an ideal frequency characteristic which is lower than or equal to a predetermined frequency, wherein the middle-high-range luminance component is combined with a middle-range luminance component and a high-range luminance component.

2. An image processing apparatus for processing complementary color image data output from an image capturing element including a complementary-color filter, comprising:
   a middle-high-range luminance component extraction section for extracting a middle-high-range luminance component having a zero amplitude at an angular frequency $\omega=\pi$ and a maximum amplitude at an angular frequency $\omega$ between $\pi/2$ and $\pi$ from a first luminance signal generated based on complementary color image data of four neighboring pixels; and
   a first synthesis section for adding the middle-high-range luminance component to a low-frequency luminance signal generated based on the complementary color image data to generate a second luminance signal.

3. An image processing apparatus according to claim 2, wherein the middle-high-range luminance component extraction section uses at least one even-number-size filter to arithmetically process the first luminance signal.

4. An image processing apparatus according to claim 3, wherein the even-number-size filter is a two-dimensional filter, and has coefficients symmetrical with respect to a x-direction and a y-direction.

5. An image processing apparatus according to claim 4, wherein:
   the even-number-size filter includes a first low-pass filter having a differentiation capability and a second low-pass filter; and
   a difference between an output obtained by arithmetically processing the first luminance signal using the first low-pass filter and an output obtained by arithmetically processing the first luminance signal using the second low-pass filter is output as the middle-high-range luminance component.

6. An image processing apparatus according to claim 5, further comprising a first luminance signal generation section for generating the first luminance signal by adding complementary color image data from four neighboring pixels out of the complementary color image data together.

7. An image processing apparatus according to claim 3, wherein:
   the even-number-size filter includes a first low-pass filter having a differentiation capability and a second low-pass filter; and
   a difference between an output obtained by arithmetically processing the first luminance signal using the first low-pass filter and an output obtained by arithmetically processing the first luminance signal using the second low-pass filter is output as the middle-high-range luminance component.

8. An image processing apparatus according to claim 7, further comprising a first luminance signal generation section for generating the first luminance signal by adding complementary color image data from four neighboring pixels out of the complementary color image data together.

9. An image processing apparatus according to claim 8, further comprising:
   a middle-range luminance extraction section for extracting a middle-range luminance component based on the second luminance signal;

a high-range luminance extraction section for extracting a high-range luminance component based on the second luminance signal; and a second synthesis section for adding at least one of the middle and high-range luminance components to the second luminance signal to generate a third luminance signal.

10. An image processing apparatus according to claim 3, further comprising a first luminance signal generation section for generating the first luminance signal by adding complementary color image data from four neighboring pixels out of the complementary color image data together.

11. An image processing apparatus according to claim 3, further comprising:

a middle-range luminance extraction section for extracting a middle-range luminance component based on the second luminance signal;

a high-range luminance extraction section for extracting a high-range luminance component based on the second luminance signal; and a second synthesis section for adding at least one of the middle and high-range luminance components to the second luminance signal to generate a third luminance signal.

12. An image processing apparatus according to claim 2, further comprising a first luminance signal generation section for generating the first luminance signal by adding complementary color image data from four neighboring pixels out of the complementary color image data together.

13. An image processing apparatus according to claim 2, further comprising:

an interpolation section for calculating missing components for each pixel having Ye-, Cy-, Mg-, or Gr-component by interpolation to obtain a complementary image signal before the low-frequency luminance signal is generated, wherein the interpolation section calculates missing components by arithmetically processing the complementary color image data using an odd-number-size filter.

14. An image processing apparatus according to claim 13, further comprising:

an RGB generation section provided at a subsequent stage of the interpolation section, for generating R, G and B image signals based on the complementary color image from the interpolation section.

15. An image processing apparatus according to claim 14, wherein the RGB generation section calculates R, G and B image signals based on the complementary-color image signal output from the interpolation section in accordance with expression below:

$$\begin{pmatrix} R \\ G \\ B \end{pmatrix} = \begin{pmatrix} C_{11} & C_{12} & C_{13} & C_{14} \\ C_{21} & C_{22} & C_{23} & C_{24} \\ C_{31} & C_{32} & C_{33} & C_{34} \end{pmatrix} \begin{pmatrix} Ye \\ Cy \\ Gr \\ Mg \end{pmatrix}$$

16. An image processing apparatus according to claim 15, further comprising:

a middle-range luminance extraction section for extracting a middle-range luminance component based on the second luminance signal;

a high-range luminance extraction section for extracting a high-range luminance component based on the second luminance signal; and a second synthesis section for adding at least one of the middle and high-range luminance components to the second luminance signal to generate a third luminance signal.

17. An image processing apparatus according to claim 2, further comprising:

a middle-range luminance extraction section for extracting a middle-range luminance component based on the second luminance signal;

a high-range luminance extraction section for extracting a high-range luminance component based on the second luminance signal; and a second synthesis section for adding at least one of the middle and high-range luminance components to the second luminance signal to generate a third luminance signal.

18. An image processing apparatus according to claim 2, further comprising:

a median filtering section for removing noise contained in a color difference signal generated based on the complementary color image data, wherein the median filtering section includes a plurality of median filters having different sizes, the sizes of the median filter are switched depending on an amount of change in the color difference signal.

* * * * *